US 6,657,035 B1

(12) United States Patent
Nakata et al.

(10) Patent No.: US 6,657,035 B1
(45) Date of Patent: Dec. 2, 2003

(54) MOISTURE-CURABLE ONE-PACK-TYPE URETHANE ADHESIVE COMPOSITION

(75) Inventors: Yoshihiro Nakata, Takatsuki (JP); Shinji Ochi, Takatsuki (JP)

(73) Assignees: Sunstar Giken Kabushiki Kaisha, Osaka (JP); Uni-Sunstar B.V., Amsterdam (NL)

( * ) Notice: Subject to any disclaimer, the term of this patent is extended or adjusted under 35 U.S.C. 154(b) by 0 days.

(21) Appl. No.: 10/169,732

(22) PCT Filed: Jan. 19, 2000

(86) PCT No.: PCT/JP00/00212
§ 371 (c)(1), (2), (4) Date: Jul. 16, 2002

(87) PCT Pub. No.: WO01/53423
PCT Pub. Date: Jul. 26, 2001

(51) Int. Cl.[7] .................. C08G 18/20; C08G 18/24; C08G 18/10; C08G 77/18
(52) U.S. Cl. ................ 528/18; 528/21; 528/28; 528/53; 528/58; 528/59; 528/73
(58) Field of Search ................ 528/18, 21, 28, 528/53, 58, 59, 73

(56) References Cited

FOREIGN PATENT DOCUMENTS

| EP | 0 668 302 | 8/1995 |
| JP | 5-117619 | 5/1993 |
| JP | 8-245940 | 9/1996 |
| JP | 11-71565 | 3/1999 |
| JP | 11-263962 | 9/1999 |
| JP | 11-263963 | 9/1999 |
| JP | 11-293221 | 10/1999 |

*Primary Examiner*—Rabon Sergent
(74) *Attorney, Agent, or Firm*—Jacobson Holman PLLC

(57) ABSTRACT

The present invention provides a moisture-curing one-pack urethane adhesive composition which has a good adhesive property to a painted steel. The moisture-curing one-pack urethane adhesive composition according to the present invention contains an isocyanate group-terminated urethane prepolymer as a main component, and also contains (1) a silane coupling agent as an adhesive promoter, and (2) (a) 2,2'-dimorpholinodiethyl ether and/or di(2,6-dimethylmorpholinoethyl)ether, and (b)dibutyltin diacetylacetonate, as curing catalysts. The moisture-curing one-pack urethane adhesive composition according to the present invention is particularly suitable for bonding automotive window glasses to automotive bodies.

6 Claims, No Drawings

MOISTURE-CURABLE ONE-PACK-TYPE URETHANE ADHESIVE COMPOSITION

This is a 371 of PCT/JP00/00212 filed Jan. 19, 2000, the diclosure of which is incorporated herein by reference.

TECHNICAL FIELD

The present invention relates to a moisture-curing one-pack urethane adhesive composition. More particularly, the present invention relates to a moisture-curing one-pack urethane adhesive composition which has a good adhesive property to a painted steel and can be used, for example, for bonding automotive window glasses.

BACKGROUND ART

A moisture-curing one-pack urethane adhesive composition containing an urethane prepolymer as a main component is used for bonding automotive window glasses, said urethane prepolymer being, for example, a reaction product of a polyol and an excess of a polyisocyanate compound and having isocyanate groups at terminal ends of molecules. A method of bonding and mounting window glasses to an automotive body is adopted in which an adhesive composition is applied to the periphery of the window glasses and the applied window glasses are installed to body flanges. In this bonding process, a primer containing a polyisocyanate compound as a main component is usually used as a pretreating agent, but a process without any primer is needed from the viewpoint of the reduction of process steps.

However, it is difficult to bond the glasses without any primer to a painted steel coated with recent paints such as high solid paints, acid rain resistant paints, easy maintenance paints and the like.

DISCLOSURE OF THE INVENTION

Accordingly, the present inventors have intensively investigated in order to improve the adhesive property of the above moisture-curing one-pack urethane adhesive composition without any primer. As a result, it was found that a moisture-curing one-pack urethane adhesive composition having a good adhesive property to a painted steel is obtained by the use of a particular adhesive promoter and a particular curing catalyst.

Thus, the present invention provides a moisture-curing one-pack urethane adhesive composition comprising an isocyanate group-terminated urethane prepolymer as a main component, and (1) a silane coupling agent as an adhesive promoter, and
(2) (a) 2,2'-dimorpholinodiethyl ether and/or di(2,6-dimethylmorpholinoethyl)ether, and (b) dibutyltin diacetylacetonate, as curing catalysts.

BEST MODE FOR PRACTICING THE INVENTION

The moisture-curing one-pack urethane adhesive composition according to the present invention contains an isocyanate group-terminated urethane prepolymer as a main component. The urethane prepolymer may be prepared in a conventional manner by reacting various polyols with an excess amount of polyisocyanate compounds (usually, OH/NCO=1/1.5 to 1/4.0).

The above polyols include, for example, polyether polyols such as polyoxyalkylene polyols (referred to as PPG), modified polyether polyols and polytetramethylene ether glycols; polyester polyols such as condensed polyester polyols, lactonic polyester polyols and polycarbonate diols; polyols containing a main chain consisting of C—C bonds such as acrylic polyols, polybutadiene polyols, polyolefinic polyols and saponified ethylene-vinyl acetate copolymers; other flame-retardant polyols, phosphorus-containing polyols, halogen-containing polyols and the like.

The above polyisocyanate compounds include, for example, tolylene diisocyanate (TDI), 4,4'm-diphenylmethane diisocyanate (MDI), xylylene diisocyanate (XDI), hexamethylene diisocyanate (HDI), isophorone diisocyanate (IPDI), lysine diisocyanate, isopropylidene-bis (4-cyclohexylisocyanate), hydrogenated XDI and the like.

The moisture-curing one-pack urethane adhesive composition according to the present invention contains the above isocyanate group-terminated urethane prepolymer in an amount of 20 to 60% by weight, based on the adhesive composition as a whole.

The moisture-curing one-pack urethane adhesive composition according to the present invention contains a silane coupling agent as an adhesive promoter, in addition to an isocyanate group-terminated urethane prepolymer.

The above silane coupling agent includes, for example, epoxyalkylalkoxysilane, mercaptoalkylalkoxysilane, vinylalkylalkoxysilane, phenylalkoxyalkylalkoxysilane, isocyanatoalkylalkoxysilane, aminoalkylalkoxysilane and the like. Preferably, the silane coupling agent is mercaptopropyltrimethoxysilane, mercaptopropyl-methyldimethoxysilane, γ-N-phenylaminopropyltrimethoxysilane and/or γ-isocyanatopropyl-trimethoxysilane. The silane coupling agent may be present in an amount of 0.1 to 5% by weight, based on the total amount of the adhesive composition containing an isocyanate group-terminated urethane prepolymer and others.

Also, the moisture-curing one-pack urethane adhesive composition according to the present invention contains (a) 2,2'-dimorpholinodiethyl ether and/or di(2,6-dimethylmorpholinoethyl)ether, and (b) dibutyltin diacetylacetonate as curing catalysts, in addition to an isocyanate group-terminated urethane prepolymer and an adhesive promoter.

The 2,2'-dimorpholinodiethyl ether and/or di(2,6-dimethylmorpholinoethyl) ether may be present in an amount of 0.05 to 2.0% by weight, based on the total amount of the adhesive composition containing an isocyanate group-terminated urethane prepolymer and others. On the other hand, the dibutyltin diacetylacetonate may be present in an amount of 0.001 to 0.5% by weight, based on the total amount of the adhesive composition containing an isocyanate group-terminated urethane prepolymer and others.

A part of the isocyanate group-terminated urethane prepolymer contained in the moisture-curing one-pack urethane adhesive composition according to the present invention is preferably a hexamethylene diisocyanate derivative.

The above hexamethylene diisocyanate derivative includes, for example, biuret derivatives, isocyanurate derivatives and/or trimethylolpropane derivatives. The hexamethylene diisocyanate derivative may be present in an amount of 0.5 to 10% by weight, based on the adhesive composition as a whole.

The moisture-curing one-pack urethane adhesive composition according to the present invention may further contain plasticizers, fillers, solvents and the like, in addition to an isocyanate group-terminated urethane prepolymer, an adhesive promoter and curing catalysts.

The above plasticizers include, for example, di-isononyl phthalate, dioctyl phthalate (DOP), dibutyl phthalate, dilauryl phthalate, butyl benzyl phthalate, dioctyl adipate, di-isodecyl adipate, trioctyl phosphate, tris(chloroethyl) phosphate, tris (dichloropropyl) phosphate, a polyester of adipic acid and propylene glycol, a polyester of adipic acid and butylene glycol, an alkyl epoxystearate, an alkylbenzene, an epoxidized soybean oil and the like. The plasticizers may be present in an amount of 10 to 100% by weight, based on the adhesive composition as a whole.

The above fillers include, for example, calcium carbonate, silica, carbonblack, clay, talc, titaniumoxide, lime, kaolin, zeolite, diatomaceous earth and the like. The fillers may be present in an amount of 10 to 200% by weight, based on the adhesive composition as a whole.

The above solvents include, for example, xylene, toluene and the like. The solvents may be present in an amount of 0 to 20% by weight, if needed, based on the adhesive composition as a whole.

Also, if needed, the moisture-curing one-pack urethane adhesive composition according to the present invention may contain a tackifier (e.g. a titanate coupling agent), an antioxidant, a pigment or the like in a suitable amount.

The moisture-curing one-pack urethane adhesive composition according to the present invention can be prepared by adding in order an adhesive promoter, curing catalysts, plasticizers, fillers, solvents and other additives to an isocyanate group-terminated urethane prepolymer, and mixing them thoroughly.

EXAMPLES

The present invention is illustrated in more detail based on the following examples, but it is not limited thereto.

In the following examples, the viscosity of the product was measured using a BH-type rotary viscometer and a No.7 rotor at 20 r.p.m. and 20° C.

Example 1

To 3,000 g of a polyoxypropylene triol having a hydroxyl number of 25.0 was added 350 g of 4,4'-diphenylmethane diisocyanate (MDI), and the components were reacted under nitrogen atmosphere for three hours at 80° C. to obtain an isocyanate group-terminated urethane prepolymer having a free NCO group content of 1.90% and a viscosity of 50,000 mPas (20° C.).

To 400 parts of the isocyanate group-terminated urethane prepolymer were added 200 parts of di-isononyl phthalate, 300 parts of dried carbon black, 150 parts of calcium carbonate, 5 parts of mercaptopropyltrimethoxysilane, 18 parts of a biuret derivative of hexamethylene diisocyanate, 1 part of 2,2'-dimorpholinodiethyl ether and 0.2 part of dibutyltin diacetylacetonate, and the components were mixed by stirring under reduced pressure with degassing to prepare a moisture-curing one-pack urethane adhesive composition.

Example 2

A moisture-curing one-pack urethane adhesive composition was prepared in the same manner as that in Example 1, except that mercaptopropyltrimethoxysilane was replaced by γ-N-phenylaminopropyltrimethoxysilane.

Example 3

A moisture-curing one-pack urethane adhesive composition was prepared in the same manner as that in Example 1, except that 2,2'-dimorpholinodiethyl ether was replaced by di(2,6-dimethylmorpholinoethyl)ether.

Comparative Example 1

A moisture-curing one-pack urethane adhesive composition was prepared in the same manner as that in Example 1, except that the addition of dibutyltin diacetylacetonate was omitted.

Comparative Example 2

A moisture-curing one-pack urethane adhesive composition was prepared in the same manner as that in Example 1, except that the addition of mercaptopropyltrimethoxysilane and dibutyltin diacetylacetonate was omitted.

The adhesive compositions of Examples 1–3, Comparative examples 1 and 2 were evaluated for an adhesive property without any primer.

Ordinary Adhesive Property:

The above adhesive compositions were applied in bead form on the following painted steels. A release paper was put on the adhesive compositions and the laminate was pressed so that 5 the thickness of the adhesive compositions was 3 mm. The laminate was allowed to stand for 72 hours at 20° C. and 65% RH. A peel test by knife-cutting was carried out to evaluate the ordinary adhesive property.

The results of the test are shown in the following Table 1.

TABLE 1

| | Example | | | Comparative example | |
|---|---|---|---|---|---|
| | 1 | 2 | 3 | 1 | 2 |
| High solid paint[a] | CF 100 | CF 100 | CF 100 | AF 50 | AF 100 |
| Acid rain resistant paint[b] | CF 100 | CF 100 | CF 100 | CF 100 | AF 30 |
| Easy maintenance paint[c] | CF 100 | CF 100 | CF 100 | CF 100 | AF 100 |

CF: Cohesive failure of adhesive;
AF: Interfacial failure between adhesive and painted steel; Figures show proportions in area (%).
[a] a product of Du Pont;
[b] a product of Kansai Paint Co., Ltd.;
[c] a product of Nippon Paint Co., Ltd.

From the results of Table 1, it is apparent that the moisture-curing one-pack urethane adhesive compositions according to the present invention (Examples 1–3) have an excellent adhesive property without any primer.

INDUSTRIAL UTILIZATION

The moisture-curing one-pack urethane adhesive composition according to the present invention can be used for bonding and sealing in the fields of the automobile industry, construction industry, civil engineering and the like. In particular, the moisture-curing one-pack urethane adhesive composition according to the present invention is suitable for bonding automotive window glasses to automotive bodies.

We claim:

1. A moisture-curing one-pack urethane adhesive composition comprising an isocyanate group-terminated urethane prepolymer as a main component, and
   (1) a silane coupling agent as an adhesive promoter, and
   (2) (a)2,2'-dimorpholinodiethyl ether and/or di(2,6-dimethylmorpholinoethyl)ether, and (b)dibutyltin diacetylacetonate, as curing catalysts.

2. The moisture-curing one-pack urethane adhesive composition according to claim 1 in which the silane coupling agent is at least one compound selected from the group consisting of mercaptopropyltrimethoxysilane, mercaptopropylmethyldimethoxysilane, γ-N-phenylaminopropyltrimethoxysilane and γ-isocyanatopropyltrimethoxysilane.

3. The moisture-curing one-pack urethane adhesive composition according to claim 1 in which a part of the isocyanate group-terminated urethane prepolymer is a hexamethylene diisocyanate derivative.

4. The moisture-curing one-pack urethane adhesive composition according to claim 3 in which the hexamethylene diisocyanate derivative is at least one compound selected from the group consisting of biuret derivatives, isocyanurate derivatives and trimethylolpropane derivatives.

5. The moisture-curing one-pack urethane adhesive composition according to claim 1 in which the silane coupling agent is present in an amount of 0.1 to 5% by weight, the 2,2'-dimorpholinodiethyl ether and/or di(2,6-dimethylmorpholinoethyl) ether is present in an amount of 0.05 to 2.0% by weight, and the dibutyltin diacetylacetonate is present in an amount of 0.001 to 0.5% by weight, all the amounts being based on the adhesive composition as a whole.

6. The moisture-curing one-pack urethane adhesive composition according to claim 3 in which the hexamethylene diisocyanate derivative is present in an amount of 0.5 to 10% by weight, based on the adhesive composition as a whole.

* * * * *